March 14, 1967     D. A. BURT     3,309,675
INTERRUPTION CONTROL APPARATUS FOR A COMPUTER
Filed Sept. 27, 1963     2 Sheets-Sheet 1

INVENTOR
Donald A. Burt
BY
ATTORNEY

WITNESSES:
John L. Chopp
James F. Young

United States Patent Office 3,309,675
Patented Mar. 14, 1967

3,309,675
INTERRUPTION CONTROL APPARATUS FOR A COMPUTER
Donald A. Burt, Franklin Township, Murrysville, Pa., assignor to Westinghouse Electric Corporation, East Pittsburgh, Pa., a corporation of Pennsylvania
Filed Sept. 27, 1963, Ser. No. 312,125
6 Claims. (Cl. 340—172.5)

This invention relates in general to computer control apparatus, and more particularly to computer control apparatus operative to interrupt the programming operation of a computer upon the occurrence of some external event for which it is desired that the otherwise and normally programmed computer operation should be interrupted.

For example, when a computer is coupled to control a machine such as a steel rolling mill or the like, the programmed operation of the computer at a given time might be to determine the next pass screw down setting for the rolling mill for a succeeding workpiece. The occurrence of an output signal from a workpiece sensing hot metal detector, to signify the presence of a preceding workpiece about to enter a particular stand of the rolling mill, might be desired to interrupt this next pass screw down setting calculation by the computer and instead cause the computer to control the motor speed for that stand, such that the speed of the rolls will be appropriate for the entrance of this preceding workpiece.

It is already known in the prior art to employ transistor switching circuits to interrupt the programmed operation of a computer. The latter circuits do not provide adequate rejection of noise signals and do not adequately isolate the computer from undesired disturbances that could result in malfunctions of the computer itself. In addition, serious damage to other coupled peripheral circuitry and devices has resulted from the use of transistor switching circuitry for this purpose due to the lack of adequate isolation therefor.

It is an object of the present invention to provide an improved input signal interrupting circuit for a computer such that the desired isolation is presented between the computer and peripheral controlling devices and in addition better transfer is effected for input signals from those peripheral devices for the interruption of the computer, which signals can be in the order of a few milliseconds be substantially continuous in duration.

It is an additional object to provide improved operation interrupting circuit means operative with a computer to better permit only one interruption for each appropriate input signal and to better synchronize the interruption of the computer by the respective input signals to prevent undesired interference between them.

It is a further object of the present invention to provide a better storage of input information that a peripheral device has called for the interrupt of the computer until this information can be transferred into the computer to effect the desired interruption thereof.

These and other objects of the present invention are accomplished by an input circuit operative with a computer or the like and including a square loop core member operative with a storage capacitor circuit which is charged upon closure of an external contact or the like to signify a suitable interrupt input signal, and including a four-layer switching diode operative to prevent the application of the charge voltage stored in the capacitor to effect a change of state in the core member until a sensing or probe pulse is applied, and circuit means for preventing multiple interrupts including a series capacitor.

The various features of the present invention may better be understood with reference to the accompanying drawings wherein:

FIG. 3 is a curve illustrating the operation of the four-layer diode shown in FIG. 2.

FIG. 4 is a curve showing the square loop saturation characteristic of the core member.

Figure 1:
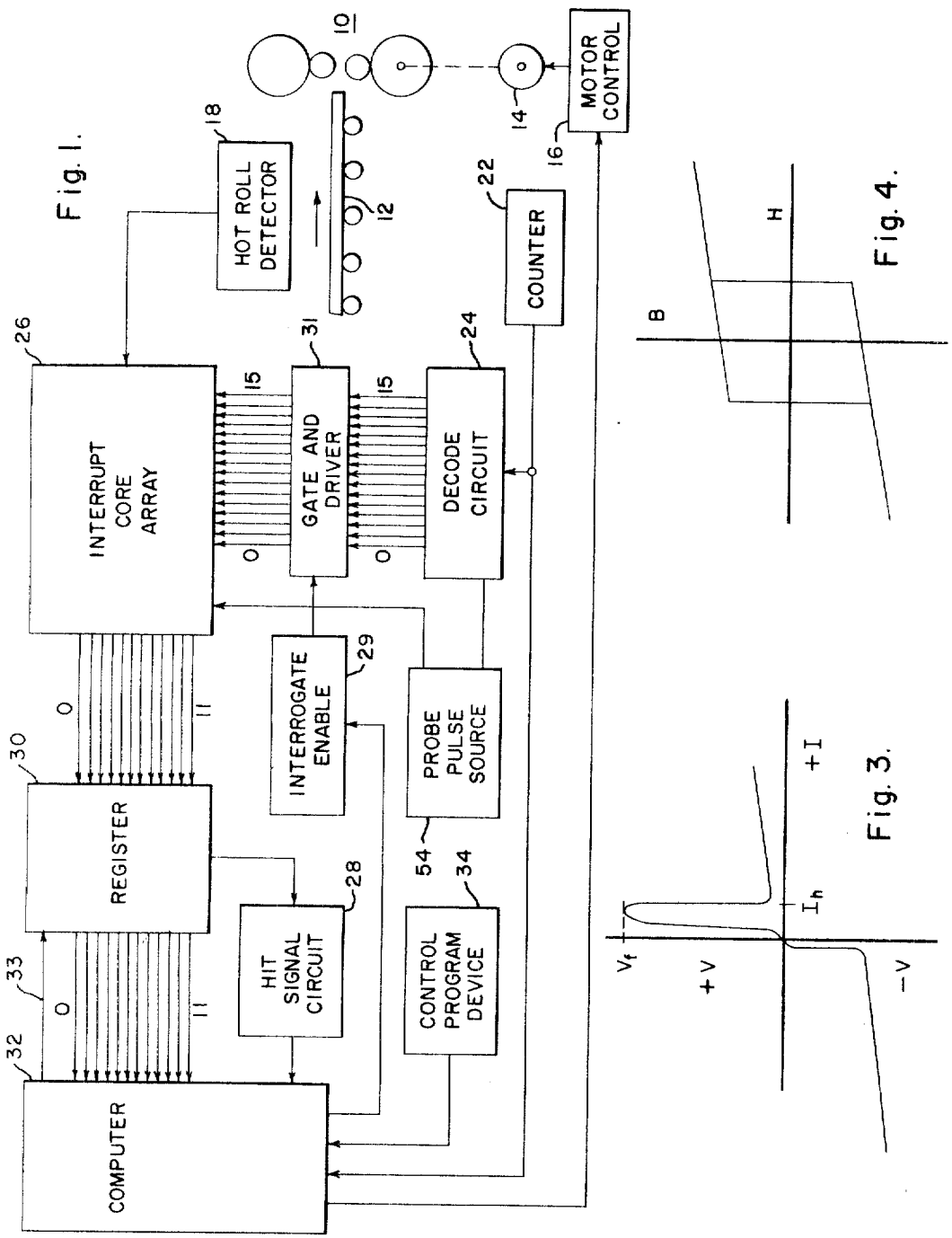
FIGURE 1 is a diagrammatic showing of control apparatus in accordance with the teachings of the present invention.

In FIGURE 1 there is shown a rolling mill stand 10 operative to receive a workpiece 12 travelling in a direction toward the rolling mill stand 10. A motor 14 is operative to drive the rolls of the mill stand 10 as determined by a conventional motor control 16. A hot metal detector 18 is operative to sense the presence of the workpiece 12 and to provide a computer interrupt signal to the interrupt core array 26. A counter 22, which is free running and operative to count through 0 to 15 in binary form in approximately ½ millisecond provides output signals to a decode circuit 24, which receives the binary output signals from the counter 22 and decodes this information into 16 interrogate signals, which are fed to the interrupt core array 26. In this regard, the 16 signals from the decode circuit 24 are operative to energize the respective word cores in the provided interrupt core aray 26 which is arranged with 16 word columns of memory cores, each column having 12 bit rows of cores, such that the columns correspond to the words and the rows correspond to the word bits. Thusly, particular bit memory cores of the interrupt core array 26 are energized to change the respective operative states to indicate the application of interrupt input signals. One of which may be supplied to a memory core from the hot metal detector 18 and others can be from a plurality of other interrupt signal sources. The respective sense interrupt signals from the interrupt core array 26 are supplied to the interrupt input data register 30 which includes twelve bistable flip-flop circuits, to signal an interrupt operation to the computer. The interrupt input register is operative with the computer 32, normally operative with a control program device 34, to interrupt its operation by the interrupt signal from the input data register 30 for the purpose of controlling the motor 14 as will be later described.

When an interrupt signal is present in the input data register 30, a hit signal switch circuit 28 is energized to notify the computer 32 that an interrupt signal is to be sensed. The computer 32 now reads the counter signal level to identify the word priority of the interrupt signal stored in the input data register 30 and sends a signal to remove the enable signal supplied by the interrogate enable circuit 29 to thereby block the gate and driver circuit 31. If the priority of the already programmed operation of the computer 32 is lower than that of the available interrupt signal to be sensed and in the input data register 30, the computer 32 will respond to this interrupt signal and then send a signal through a connection 33 to clear the input data register 30 and again allows the interrogate enable circuit 29 to open the gate and driver circuit 31 after the counter 22 has returned to its zero and highest priority word count level. Thusly, if the above interrupt signal was stored in the interrupt core array 26 in the third word column of cores, the counter 22 would return the interrogate operation to the highest priority zero word column of cores after the computer had processed the one or more interrupt signals stored in the input data register in the event that a higher priority interrupt signal was now present in the interrupt core array 26.

Figure 2:
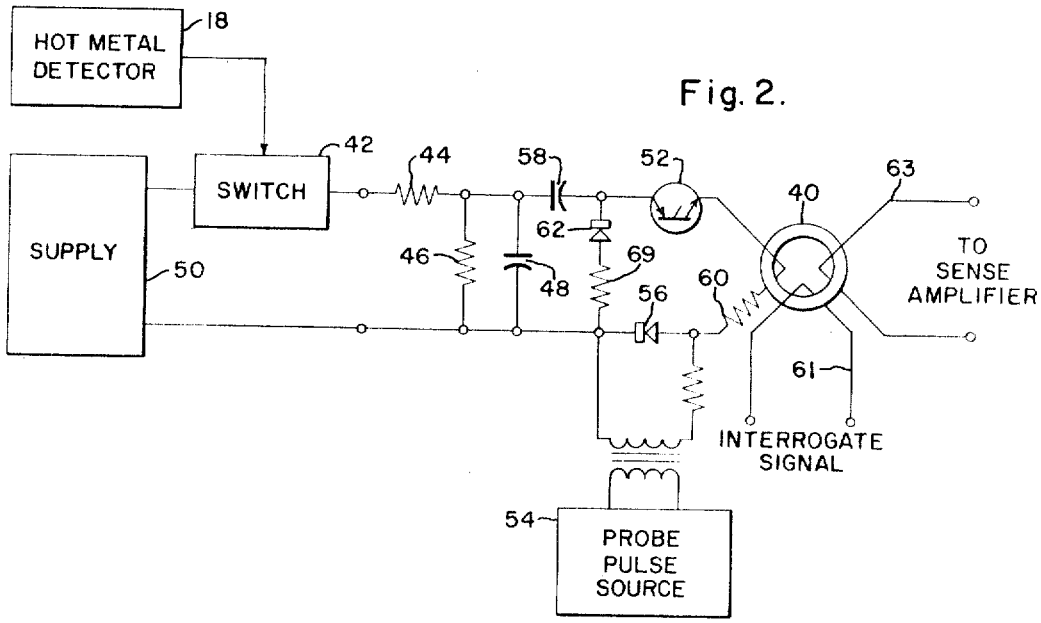
FIG. 2 is a schematic showing of the computer interruption control circuit of the present invention.

In FIG. 2 there is shown an interrupt signal circuit such as provided for each core in the interrupt core array and including a square loop memory core member 40 which provides the desired computer input isolation and interrupt signal memory function required of the circuit shown in FIG. 2. The core 40 has two stable flux states of operation which are respectively positive and negative saturation. An interrupt input signal is applied when the hot metal detector 18 causes switch 42 to close and thereby apply an input interrupt signal to the voltage divider including resistor 44 and resistor 46. This input signal causes the capacitor 48 to be charged to a voltage in the order of 30 volts in a period of about 1.5 milliseconds as determined by the charging circuit arrangement including the resistors 44 and 46 and the 48 volts of the D.C. power supply 50. At an appropriate time determined by the probe pulse provided every ½ millisecond the capacitor 48 can be discharged rapidly through the core member 40 to cause the core member 40 to be set to its positive saturation state. The four-layer switching diode 52, commonly known as a Shockley diode, prevents the discharge of the capacitor 48 until a time when there occurs simultaneously both a voltage across the capacitor 48 of a sufficiently high value in the order of 24 volts, and a probe pulse from the probe pulse source 54 in the order of 6 volts to provide the 30 volts required to fire the diode 52.

The operating characteristic of the four-layer diode 52 is well known and is shown in FIGURE 3. It is such that the diode supports voltage in the forward direction until the firing voltage $V_f$ of about 30 volts is reached, at which point the diode suddenly becomes fully conducting except for a forward drop of about one volt. If the current through the diode is reduced below the holding current $I_h$, the diode recovers and again supports the voltage in the forward direction. The characteristic in the reverse direction is similar to that of a normal silicon diode.

After the signal from the hot metal detector 18 is operative to close the switch 42, which could comprise a relay switch, the voltage across the capacitor 48 for its particular core begins to approach the firing voltage of the four-layer diode, with the upper plate of the capacitor having a positive charge and the lower plate of the capacitor being at ground potential. The probe pulse source 54 periodically provides a probe pulse at a time between the 15 and 0 count level of counter 22 when none of the interrupt input cores are being interrogated to cause a probe pulse voltage to appear across the diode 56 with the polarity as shown in FIG. 2. When the sum of the voltage across the capacitor 48 and the probe pulse voltage across the diode 56 is greater than the switching voltage of the four-layer diode 52, the capacitor 48 discharges through a path including the capacitor 58, the four-layer diode 52, the resistor 60, the magnetic core 40 and the diode 56. The probe pulses occur with sufficient frequency about every ½ millisecond that the four-layer diode 52 is never fired by the voltage build-up across the capacitor 48 alone which per se requires about 1½ millisecond. The resitor 60 is provided to limit the peak current through the core member 40 and cause the circuit time constant to be sufficiently long for the core member 40 to switch its state of operation.

The function of the capacitor 58 is to prevent multiple interrupts for one closure of the switch or relay contact 42. The capacitance of the capacitor 58 is much smaller than the capacitance of the capacitor 48. Before closure of switch 42 both capacitor 48 and capacitor 58 are discharged. After a closure of switch 42 the capacitor 48 begins to charge, but the capacitor 58 is prevented from charging by the diode 62 and the four-layer diode 52 except for a small and insignificant leakage current. After the four-layer diode 52 fires, the capacitor 48 discharges and the capacitor 58 charges until the voltages across the latter capacitors are substantially equal. Since the capacitor 48 is much larger than the capacitor 58, the voltage across the capacitor 48 drops by only a small amount and the capacitor 58 is charged to substantially the same relatively high voltage. The current through the core 40 becomes zero and the four-layer diode 52 recovers and again starts to support voltage. The voltage across capacitor 58 now subtracts from the sum of the voltage across capacitor 48 and the probe voltage across the diode 56 such that the net voltage appearing across the four-layer diode 52 will not reach the firing voltage as long as the contact closure input signal remains while the switch 42 is closed. When the switch 42 is open, the capacitor 48 discharges through the resistor 46, and the capacitor 58 discharges through the resistors 69 and 46 and the diode 62. The interruption control circuit then is recovered and ready for the next contact closure to signify an input signal.

The resistors 44 and 46 and the capacitor 48 provides a filtering of applied input signals in addition to their other functions. The filter time constant is about 1.5 milliseconds which is sufficient to prevent most noise spikes from causing interrupt operation relative to the computer. The square loop core 40 is inherently insensitive to noise because of the large current required for switching. The common mode noise rejection is high because of few turns used in each winding make the capacitive coupling low.

Multiple inputs such as could be caused by relay contact bounce are found to be no problem with most contacts that might be used for interrupt inputs. Contact bounce persisting as long as 25 to 30 milliseconds have been found to result in only one interrupt of the computer. If the switch 42 comprised a relay contact that bounces open again after the four-layer diode has fired the time constant with which capacitor 58 discharges has been made sufficiently long that it retains enough voltage to prevent refiring of the four-layer diode 52 when the contact of switch 42 bounces to close again.

In FIG. 4 there is shown the well known and idealized square hysteresis loop of the magnetic core member 40.

Figure 5:
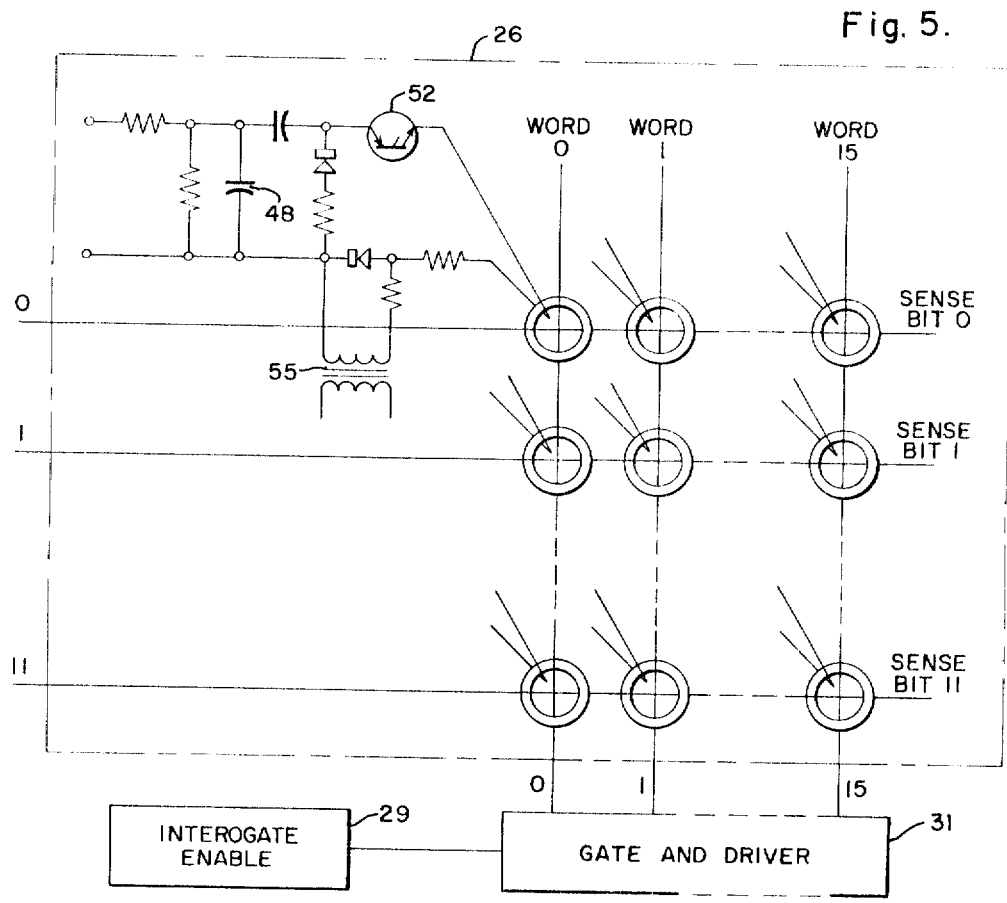
FIG. 5 is a diagrammatic showing of a core array operative to interrupt the computer operation.

The interrupt core array 26 shown in FIGURE 1 includes a two dimensional matrix arrangement of square loop cores as shown in FIG. 5. The columns are the words and the interrogate windings of each word are in series such that all bits of a given word are interrogated at one time. The rows are the bits of the words and the sense windings for each bit are connected in series. After the input circuits are probed by the probe pulse source 54 to set the respective cores where there have been input signal contact closures, the individual words are interrogated one at a time into the input data register 30. Any core that has been set to positive saturation by an interrupt input signal will have an output signal from its sense winding when the word containing it is interrogated. This sense winding signal is amplified, and sets a flip-flop bit in the interrupt input register 30 shown in FIGURE 1 to cause an interrupt in the operation of the computer 32 and to prevent any further interrogation of the cores until the interrupt register 30 is read into the computer through an input channel. Provision is made for the probe pulse source 54 to continue operating during this process of taking an interrupt into the computer. If more than one bit core in a word has been set before the word has been interrogated all the set bits of that word will be taken into the interrupt input register 30 and the computer at the same time.

The square loop core member 40 as shown in FIG. 2 has two stable flux states of operation, positive and negative saturation. An interrupt input signal and the resulting closure of contact 42 will cause the core 40 to be driven to the positive saturation state. If a given core is in the positive saturation state, an interrogate pulse will drive it to negative saturation with the flux change resulting to induce a voltage in the sense winding for that core. The signal from the sense winding is amplified and provides the interrupt signal to the computer. If the core is in negative saturation when the interrogate pulse occurs, there will be very little flux change in the core and a negligible voltage induced in its sense winding. The input signal and contact closure are able to set the core to positive saturation, with the core 40 requiring about 0.5 ampere turns for switching. Since the core is very small, only a few turns can be used and a relative high switching current is needed. To supply this as a continuous current to all the interrupt input cores is neither practical or desirable. Instead, the interrupt input signal and contact closure cause the capacitor 48 to charge to a voltage determined by the voltage divider including resistors 44 and 46, and at an appropriate time in accordance with the provision of the probe pulse from the probe pulse source 54 the capacitor 48 is discharged rapidly through the core member 40 causing it to be set to positive saturation.

In reference to FIG. 5 an interrogate enable signal is supplied to gate and driver circuits 31 to enable the decoded counter signals to interrogate the windings of the respective word columns of the core array as shown in FIG. 5. One of such interrogate windings is shown in FIG. 2 as winding 61. The interrogate signals are supplied to respective word columns of cores. Any of the 12 bit cores in a given word column storing an input interrupt signal will be switched thereby to its positive saturation state of operation by the interrogate pulse through its winding 61 shown in FIG. 2 to result in an output signal being supplied to sense winding 63 shown in FIG. 2.

Thusly, it will be seen that the interrupt control circuit as seen in FIG. 2 is operative to isolate the computer as provided by the square loop core 40 and the pulse transformer 55 operative to supply the probe pulses from the probe pulse source 54. The contact closure can be for any length of time greater than the time required to charge the capacitor 48 sufficiently for the four-layer diode 52 to fire upon the provision of the probe pulse. The capacitor 58 allows only one interrupt regardless of the length of time that the contact 42 is closed. A probe pulse from the probe pulse source 52 synchronizes the time in which the core member 40 can be set to thereby prevent interference with the interrogating of the cores. The square loop core member 40 becomes set to positive saturation and stores the information that a peripheral device has called for an interrupt of the computer until this information is transferred into the interrupt input register 30 shown in FIGURE 1. The interrupt input circuit is able to receive the next interrupt after the capacitors 48 and 58 have been discharged from the previous interrupt signal. The input filter and inherent noise rejecting properties of the square loop core member 40 are sufficient to prevent most noise signals from causing undesired interrupts of the computer.

The following component values were employed in an operative embodiment of the present invention with one embodiment being constructed for 48 volt operation and the other embodiment being constructed for 125 volt operation.

|  | 48 Volts | 125 Volts |
|---|---|---|
| Resistor 44 | 5.49K | 20K. |
| Resistor 46 | 11K | 14K. |
| Capacitor 48 | 0.5 F | 0.22 F. |
| Capacitor 58 | 0.047 F | 0.027 F. |
| Resistor 64 | 10K | 100K. |
| Resistor 60 | 20.7 | 44.2. |
| Gesistor 61 | 16.2K | 16.2K. |

In reference to FIG. 2, if the D.C. power supply 50 supplied an output voltage in the order of 48 volts when the contact of switch 42 closes, the capacitor 48 charges to a voltage in the order of 24 volts when the probe pulse has a sufficient voltage of about 6 volts to fire the four-layer diode 52. The voltage across the diode 56 and the voltage across the capacitor 48 are additive relative to the voltage across the capacitor 58.

It should be understood that the computer 32 shown in FIGURE 1 includes its own priority director to determine if a normally programmed operation of the computer should continue when any given interrupt input signal is received. If a higher priority interrupt input signal is received, the programmed computer operation will be interrupted. However, if the programmed operation of the computer has a higher priority than the particular interrupt input signal, the computer 32 will continue its programmed operation until a lower priority programmed operation of the computer 32 occurs such that the now higher priority interrupt input signal will interrupt the computer operation.

It should be understood that the hot metal detector 18 shown in FIGURE 1 is operative with only the core of a particular bit of a particular word in the interrupt core array 26, and is described for purpose of example. Other interrupt signals will be similarly provided to other bit cores of the array and be of perhaps higher or lower priority as may be desired. In addition it should be understood that a modification of the present apparatus could be made to provided a controlled rectifier having a conduction controlling element, such as a silicon controlled rectifier, operative to be fired by the probe pulse to control the change of state of the core in the FIGURE 2 circuit by the charge voltage of capacitor 48 in a manner generally similar to that already described. Further modifications of the disclosed teachings will be readily apparent to those skilled in this art.

I claim as my invention:

1. Apparatus for interrupting the programmed operation of a computer during the interrogation of an interrupt core array of said computer and upon the occurrence of a predetermined event, comprising square loop magnetic signal storage means initially operative in a first stable state and capable of being switched between at least two stable states of operation, input signal providing means operative upon the occurrence of said event for providing an input signal, voltage charging means responsive to said input signal for providing a control voltage, pulse providing means for providing a pulse signal prior to said interrogation to permit the switching of said signal storage means into a second state of operation, and a control device connected between said signal storage means and said voltage charging means and responsive to said control voltage and said pulse signal for changing said signal storage means to the second state of operation upon the occurrence of said control voltage followed by said pulse signal.

2. Apparatus for interrupting the programmed operation of a computer upon the occurrence of a predetermined event, said computer having an interrupt core array suitable for interrogation, comprising a square loop signal storage core member initially operative in one of at least two stable states of saturation, input signal providing means responsive to the occurrence of said event for providing an input signal, a voltage charging capacitor responsive to said input signal for providing a control voltage after receipt of said input signal, probe pulse providing means for providing a probe pulse subsequent to the provision of said control voltage and to switch said signal storage core member into a second state of saturation at a time prior to said interrogation, and a control switching diode device connected between said signal storage core member and said voltage charging capacitor and operative with said control voltage in response to said probe pulse for changing said signal storage core member to the second state of saturation after the occurrence of said event.

3. A circuit for controlling the operation of a device in response to an input signal, said circuit including signal memory means initially operative in a first state of at least two stable states of operation, switching signal providing means responsive to said input signal for providing at least one control signal having a predetermined value in response to said input signal, sensing signal providing means for providing a sensing signal to time said change in the state of operation of the signal memory means, and switching means connected between said signal memory means and said switching signal providing means for initially storing said control signal and thereafter responsive to said sensing signal for changing the state of operation of the signal memory means in response to said control signal when said control signal is at said predetermined value, said switching means only being responsive to a first of said control signals associated with the same input signal.

4. In an apparatus for controlling the operation of a memory device in response to a control signal and a pulse source, the combination of a circuit comprising signal memory means initially operative in a first state of operation, input switching means responsive to an input signal for providing at least a first control signal of predetermined value, pulse providing means, and switching means connected between said signal memory means and said input switching means for initially storing said control signal and then being responsive to said pulse providing means for switching said signal memory means to a second state of operation, said switching means being responsive only to said first control signal associated with said input signal.

5. Apparatus as set forth in claim 4, wherein said switching means comprises two voltage storage means cooperative such that one of said voltage storage means operates relative to any additional control signals associated with the same input signal to isolate said additional control signals from said signal memory means.

6. In a computer having interrogating means for sampling an interrupt core array and apparatus for switching one or more bit cores of said interrupt core array from a first unset state of operation to a second set state of operation upon the occurrence of an input interrupt signal followed by a probe pulse signal, said apparatus comprising signal memory means initially operative in said first of two states of operation, switching signal providing means responsive to said input signal for providing a predetermined control signal, means for providing a pulse signal, control signal switching means for initially storing said control signal and thereafter responsive to said pulse signal for causing said control signal to change said signal memory means to said second set state of operation, said interrogating means being operative to return the signal memory means from said second to said first state of operation, with said interrogating means being operative after the provision of said pulse signal, and memory change sensing means for sensing a change of the state of the signal memory means.

References Cited by the Examiner
UNITED STATES PATENTS

| | | | |
|---|---|---|---|
| 3,061,192 | 10/1962 | Terzian | 235—157 |
| 3,099,819 | 7/1963 | Barnes | 340—172.5 |
| 3,222,647 | 12/1965 | Strackey | 340—172.5 |

OTHER REFERENCES

Page 265, 1962, Chu, Yaohan, Digital Computer Design Fundamentals, McGraw-Hill, New York.

ROBERT C. BAILEY, *Primary Examiner.*

R. M. RICKERT, *Assistant Examiner.*